June 17, 1930.  M. LOUGHEAD  1,764,179
HYDRAULIC BRAKE MECHANISM
Filed Nov. 6, 1928
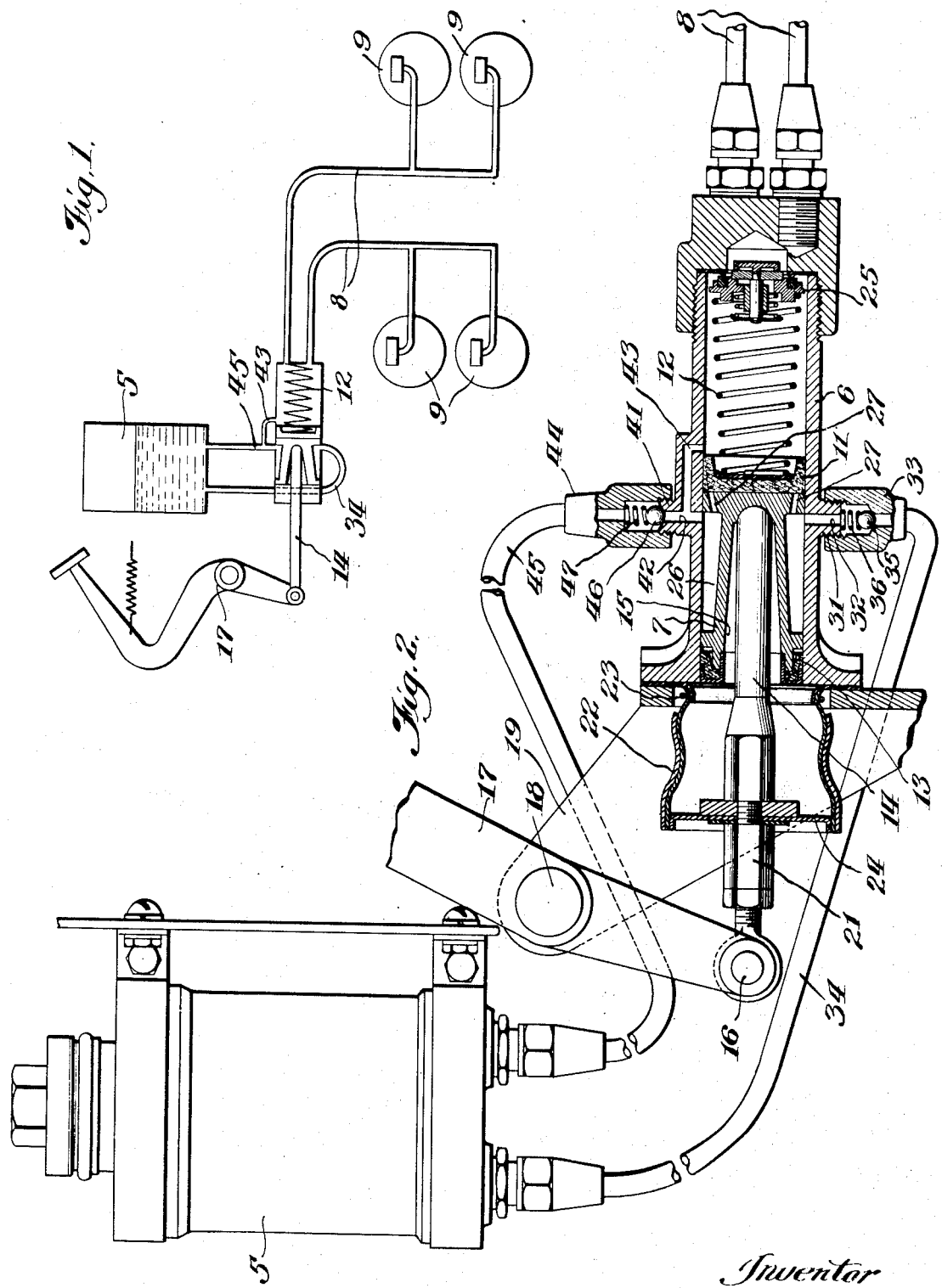
Inventor
Malcolm Loughead
By Williams, Bradbury, McCaleb & Hinkle
Attys.

Patented June 17, 1930

1,764,179

UNITED STATES PATENT OFFICE

MALCOLM LOUGHEAD, OF DETROIT, MICHIGAN, ASSIGNOR TO HYDRAULIC BRAKE COMPANY, OF LOS ANGELES, CALIFORNIA, A CORPORATION OF CALIFORNIA

HYDRAULIC BRAKE MECHANISM

Application filed November 6, 1928. Serial No. 317,593.

This invention relates to a hydraulic brake system and more particularly to an improvement in the fluid supply and master cylinder of the hydraulic brake system.

Hydraulic brake systems are usually provided with a master cylinder having a reciprocable piston therein for producing the pressure in the fluid necessary for applying the brakes. One end of the piston of the master cylinder in some types of brake systems, such, for example, as that disclosed in the co-pending application of Wallace F. Oliver, Serial No. 253,933, filed February 13, 1928, is exposed to atmospheric pressure so that when a lower than atmospheric pressure exists within the cylinder small bubbles of air are apt to enter the cylinder. On account of the high compressibility of air, even small quantities of air have a detrimental effect upon the operation of the brakes.

An object of this invention is to provide an improved hydraulic brake system.

A further object is to produce a master cylinder provided with means for keeping the master cylinder free from air.

A further object is to provide a device for circulating brake fluid through the master cylinder in an upward direction to carry any air bubbles which may be present in the master cylinder from the master cylinder.

A further object is to provide a device for supplying a greater quantity of fluid to the master cylinder during the retractile movement of the piston than is needed for the operation of the brake system, and the excess of the fluid is returned to a fluid reservoir at the end of the retractile movement, always flowing in an upward direction to convey any air bubbles which may be present therein to the fluid reservoir where it rises to the top of the fluid and is liberated.

Other objects and advantages of the apparatus will appear as the description proceeds.

In the drawings,

Fig. 1 is a diagrammatic view illustrating a complete hydraulic brake installation, including the master cylinder.

Fig. 2 is a side elevation, partly in section, of the master cylinder and fluid reservoir.

The apparatus consists of a reservoir 5, a cylinder 6, disposed in a plane beneath the reservoir, a manually actuated piston 7, within the cylinder, fluid pressure delivery pipes 8 communicating with the fluid pressure operated wheel brakes 9, and a system of passages and recesses in the cylinder and piston for replenishing fluid in the cylinder and circulating fluids through the cylinder in an upward direction for exhausting air bubbles from the cylinder.

The piston 7 is elongated and has a packing cup 11 loosely fitted against its innermost face, and normally held there in place by a compression spring 12, which also assists in moving the piston to its retracted position. The outermost end of the piston has a packing ring 13 for preventing fluid from escaping from about the piston. As the fluid is not under a high pressure at this point of the piston, a packing ring of the type illustrated is sufficient for the purpose.

The piston 7 engages with a piston rod 14, which is inserted within a deep pocket 15 formed centrally of the piston and extending inwardly from its outer end. The opposite end of the rod 14 is pivotally connected at 16 to a foot pedal 17, which in turn is pivotally supported at 18 upon a fixed bracket 19. The bracket 19 also serves to support the cylinder 6.

The length of the rod 14 may be altered by an adjusting member 21 forming a part of the rod assembly. In order to exclude dust and other extraneous substances from the walls of cylinder 6, a flexible cylindrical boot 22 is provided, one end of which is secured by a ring 23 to the bracket 19, and the opposite end of which is secured to a disc 24 mounted concentrically about the rod 14. A double acting check valve 25 is mounted at the innermost end of cylinder 6 and performs the function of maintaining a slight positive pressure in the fluid system, including the fluid pressure actuated wheel brake cylinders, thus reducing the possibility of admitting air into the master cylinder to a minimum degree.

The piston 7 has a deep annular recess 26, which is adapted to receive a fluid and form a fluid seal. A pair of bleed passages 27 connect the recess 26 with the interior of the cylinder. The bleed passages 27 are covered by the packing cup 11 during the protractile movement of the piston, thus causing a fluid pressure to be produced in the master cylinder when the piston moves forwardly. The cylinder 6 is provided with a threaded boss having a passage 32 therein which communicates with the recess 26, and inlet valve 33 connects the passage 32 through a tube 34 to the fluid supply reservoir 5. The inlet valve is provided with a valve seat upon which a ball 35 is resiliently held by a spring 36 which engages the ball lightly with the seat so as to admit fluid from the reservoir freely to the recess of the piston, but preventing a reversal of the flow of the fluid to the reservoir.

The upper wall of the cylinder is provided with a threaded boss 41 having a passage 42 leading to the recess 26. A passage 43 connects the passage 42 to the interior of cylinder 6 at a point immediately in front of the full retracted position of piston 7. An outlet valve 44 connects the passage 42 to a tube 45 leading to the fluid reservoir 5. The outlet valve 44 is provided with a ball 46 resiliently held against the valve seat by the spring 47 allowing fluid from the recess 26 or cylinder 6 to move freely in the direction of the fluid reservoir, but preventing fluid from the reservoir from returning through this valve.

The operation of the apparatus is as follows:

When the operator depresses the pedal 17, the piston 7 is moved forwardly, causing the packing cup 11 to close passage 43. A further movement of the piston will cause fluid from the master cylinder to flow through the valve 25 to the wheel brake cylinders to apply the brakes.

When the pedal 17 is released, spring 12 will tend to return piston 7 to its retracted position. On account of the valve 25 the return of the fluid into the master cylinder is retarded to maintain a positive pressure in the brake system. This action produces a low pressure in the master cylinder, causing the packing cup 11 to be drawn from the bleed passages 27 and thus drawing fluid into the master cylinder from the recess 26, which is replenished by fluid entering the recess from the inlet valve 33. When the piston has resumed its fully retracted position, there will be an excess of fluid in the master cylinder.

The fluid returning from the wheel brake cylinders, therefore, causes the excess fluid in the master cylinder to pass through passage 43 and valve 44 into the fluid reservoir 5.

During the reciprocation of piston 7, small quantities of air may enter the recess 26 by the packing ring 13. Any air thus entering the recess will tend to rise in the form of bubbles in the passage 42, and a subsequent upward movement of the fluid received from passage 43 will return the air to the fluid reservoir 5. If any air should be admitted into the cylinder through the bleed passages 27 this will also be conveyed with the excess fluid through passage 43 into the reservoir 5, with the result that the master cylinder will contain the proper amount of fluid free from air at the beginning of each forward movement of the piston to apply the brakes.

While I have illustrated and described a preferred embodiment of the invention, it is to be understood that my invention is not limited to the exact details of construction illustrated and described herein but that the scope of my invention is defined solely by the following claims.

I claim:

1. In a hydraulic brake system, a master cylinder, a piston movable therein to produce a fluid pressure for operating the brakes, a valve in the lower side of the cylinder for admitting fluid into the cylinder during the retractile movement of the piston, and a valve in the upper side of the cylinder for permitting the escape of excess fluid in the cylinder at the end of the retractile movement of the piston, said excess fluid moving upwardly to carry any air present in the cylinder from the cylinder.

2. In a hydraulic brake system, a master cylinder, a manually operable piston in said cylinder for producing a pressure for operating the brakes, said piston having a fluid seal which communicates with the cylinder during the retractile movement of the piston, a fluid supply source, an inlet valve connecting the fluid supply to the lower side of the fluid seal, an outlet valve connecting the fluid supply to the upper side of the fluid seal and to the upper side of the cylinder in the retracted position of the piston, a fluid pressure delivery port in the cylinder, a valve in said delivery port causing a low pressure in the cylinder during the retractile movement of the piston whereby fluid will be drawn into the cylinder through the inlet valve of the fluid supply source during the retraction of the piston, the excess fluid being returned to the fluid supply source through the outlet valve upon the return of the fluid from the wheel brakes to the cylinder.

3. In a hydraulic brake system, a master cylinder, a piston movable therein having an annular recess for receiving fluid and having a bleed passage leading from said recess into the cylinder, a packing carried by the forward end of the piston adapted to close said bleed passage during the protractile movement of the piston and open said bleed passage during the retractile movement of the piston, an intake valve communicating with the recess of the piston through a duct in the lower cylinder wall for admitting fluid into the recess, said fluid passing through the bleed passage during the retractile movement of the piston, an outlet valve communicating with the recess and with the cylinder through the upper wall of the cylinder in the retracted position of the piston, whereby excess fluid in the cylinder is permitted to escape through said outlet valve.

4. In a hydraulic brake system, a master cylinder, a manually operable piston in said cylinder for producing a fluid pressure, a fluid pressure delivery port in said cylinder for connection with fluid pressure actuated brakes, a source of fluid supply, means for admitting fluid from said source to the cylinder through a passage in the lower cylinder wall during the retractile movement of the piston, in greater quantities than required for the operation of the brake system, said cylinder having a passage in its upper side connecting the cylinder with said fluid source at a point immediately in front of the piston when the piston is retracted, and means for causing the excess fluid to pass from the cylinder through said passage in its upper wall.

5. In a hydraulic brake system, a master cylinder, a piston movable therein to produce a fluid pressure for operating the brakes, a fluid supply source, means including a valve located under the cylinder, for supplying from said source a greater quantity of fluid than required for the operation of the brake system during the retractile movement of the brakes, and means including an outlet valve located above the cylinder for allowing the excess fluid to return to the fluid supply source thereby assuring a supply of liquid in the cylinder and conveying any air bubbles present in the cylinder from the cylinder.

6. In a hydraulic brake system, a master cylinder, a piston movable therein to produce a fluid pressure for operating the brakes, said piston having a recess for receiving a fluid forming a fluid seal, a fluid supply source, an inlet from said supply source communicating with said recess through the lower cylinder wall, an outlet to said supply source communicating through the upper cylinder wall with said recess and with the cylinder when the piston is in its retracted position, means responsive to the piston for causing fluid from said inlet to enter the recess and the cylinder, and means for causing excess fluid to return to the fluid supply source through said outlet thereby conveying from the cylinder any air bubbles present therein.

7. In a hydraulic brake system, a master cylinder having a fluid passage in its lower side and pair of fluid passages in its upper side, a piston movable therein having a recess which is in contant communication with an upper and the lower passage in the cylinder, one of the upper passages communicating with the cylinder in front of the piston in the retracted position of the piston, said piston having means for connecting the recess with the cylinder during the retractile movement of the piston, and means for causing fluid to enter the cylinder from the lower passage, during the retraction of the piston, the excess fluid in the cylinder leaving through the upper passage at the end of the retractile movement of the piston whereby any air in the cylinder will be conveyed from the cylinder.

8. In a hydraulic brake system, a master cylinder, a piston movable therein having an annular recess for receiving a fluid to form a seal, a fluid supply source, a tube from said source leading to the lower side of said recess, a second tube leading from the upper side of said recess to the supply source, said second tube also communicating with the upper side of the cylinder, and means causing fluid from the first-mentioned tube to enter the cylinder during the operation of the piston, the excess fluid in the cylinder being discharged through said second tube.

In witness whereof, I hereunto subscribe my name this 1st day of November, 1928.

MALCOLM LOUGHEAD.